United States Patent Office 2,792,490
Patented May 14, 1957

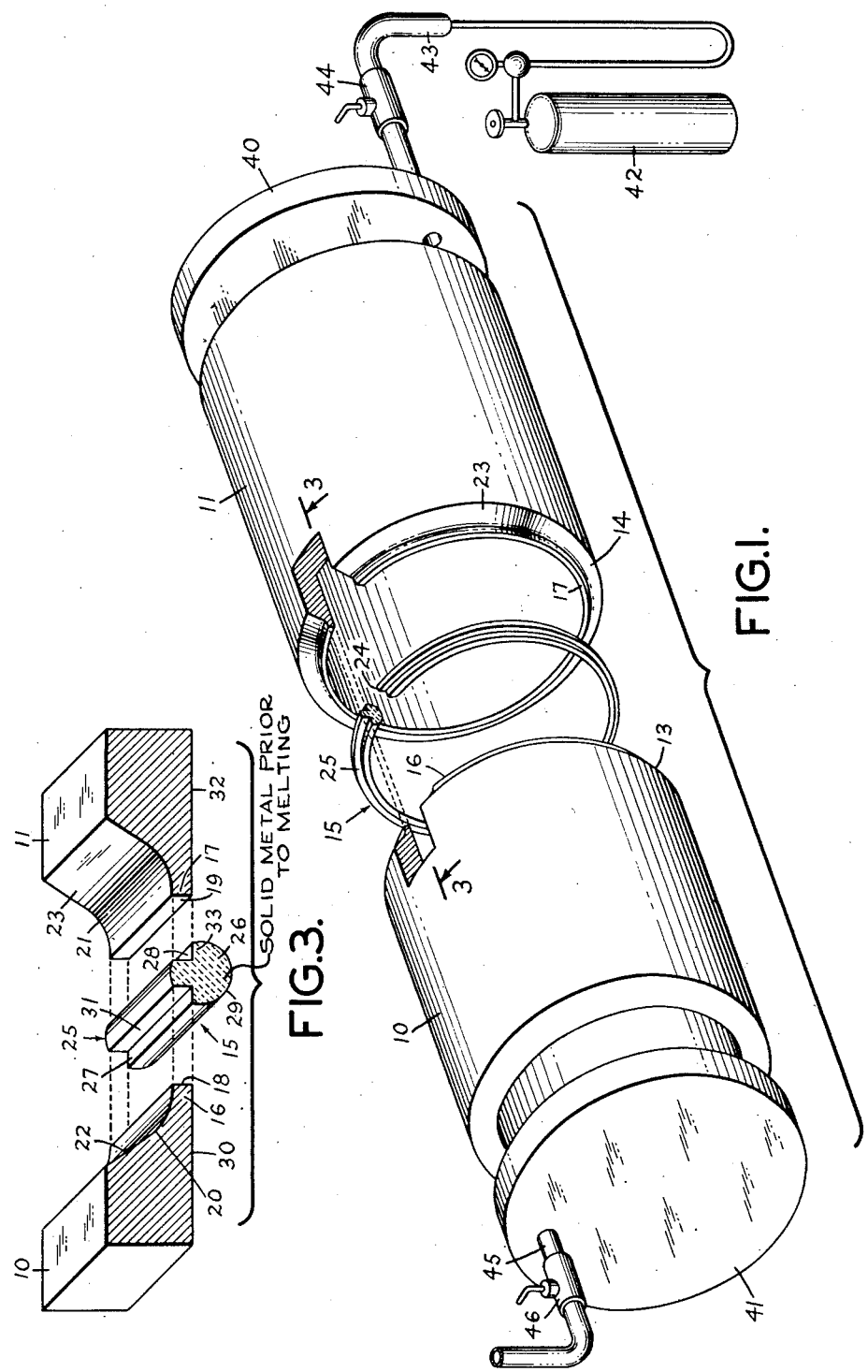

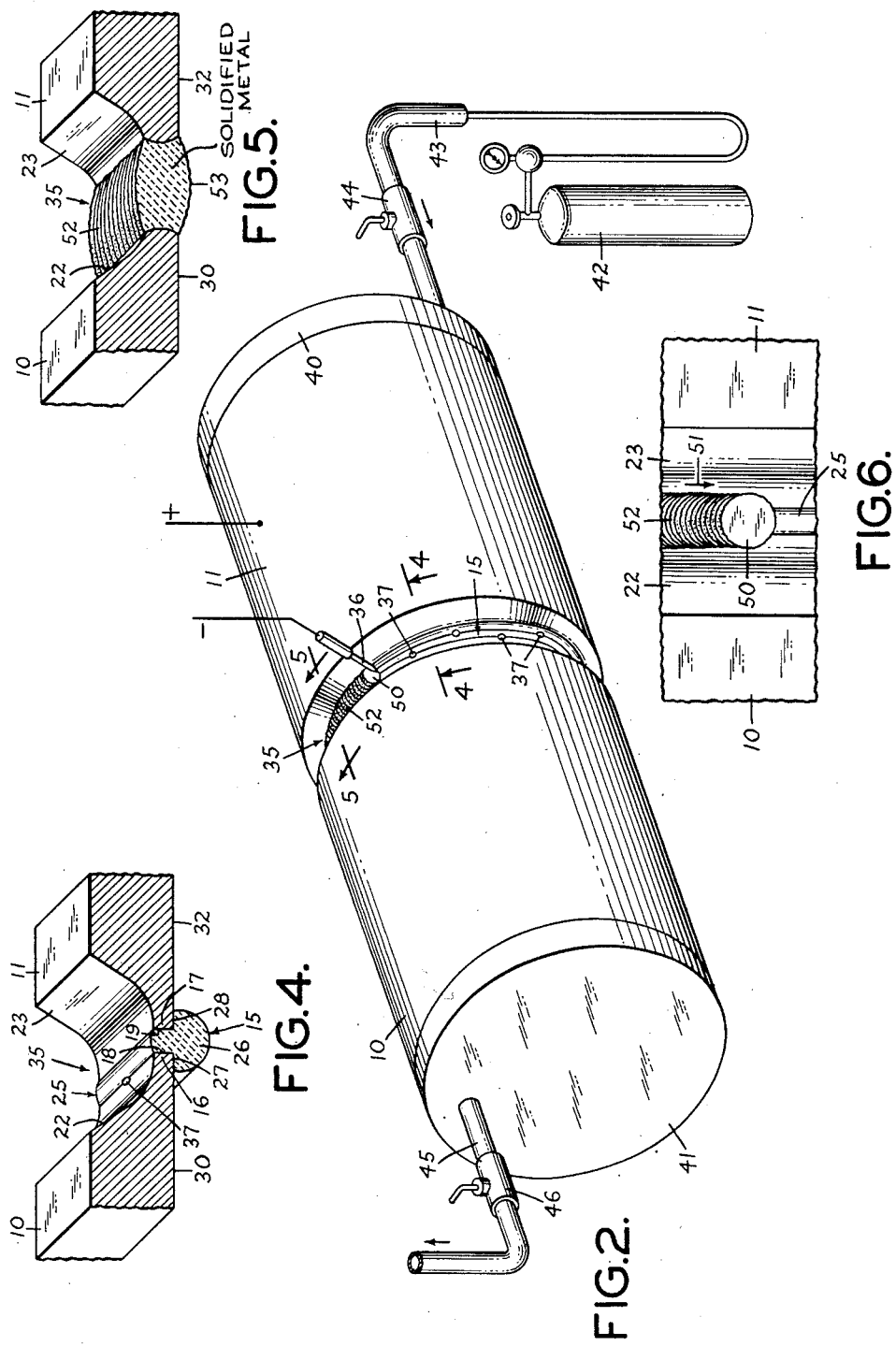

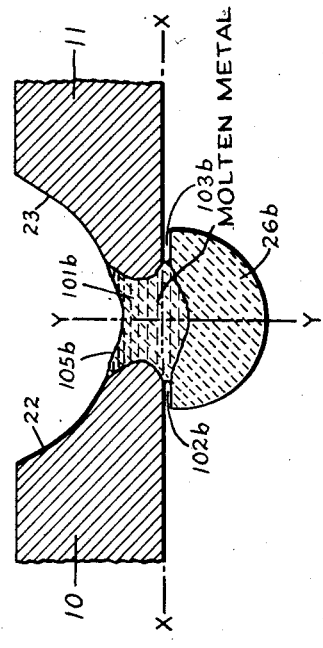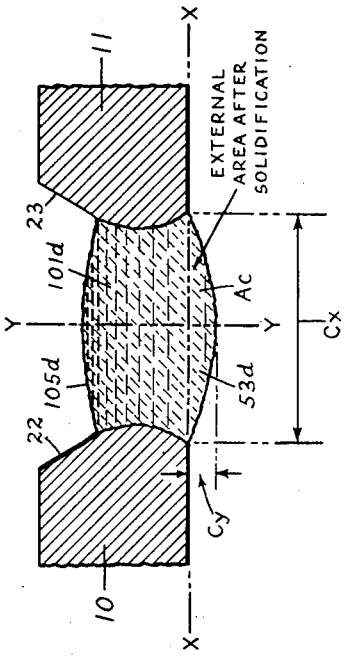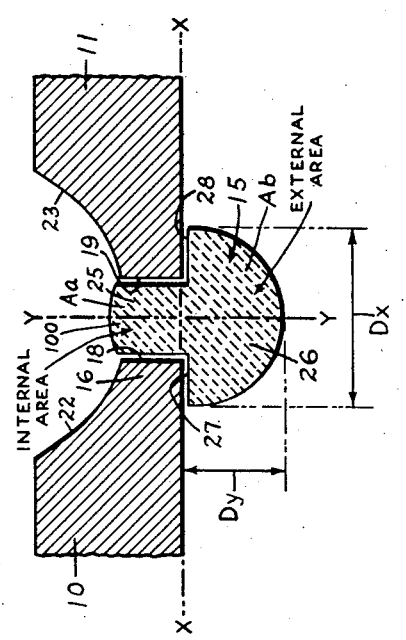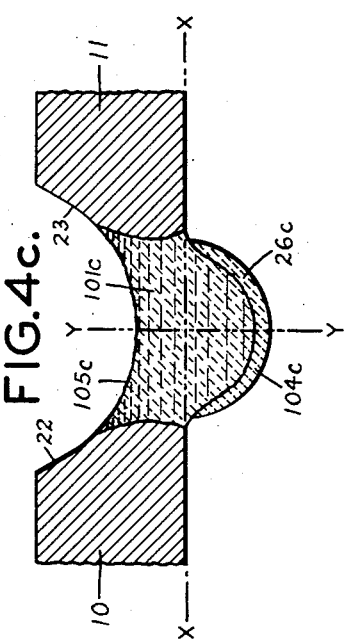

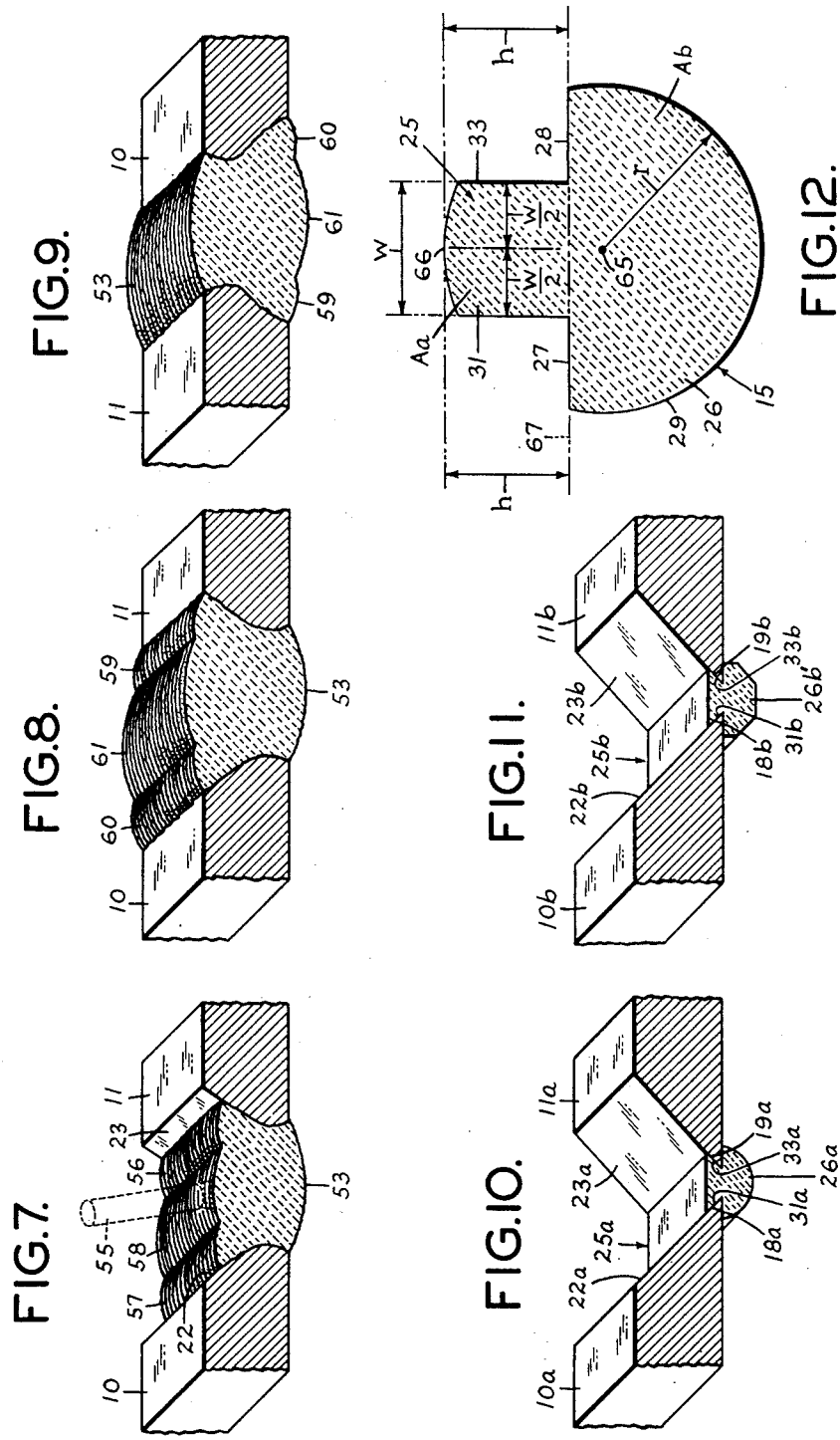

2,792,490
WELDING METHOD AND CONSUMABLE WELD INSERT THEREFOR

Theodore A. Risch, New London, and Herbert B. King, Niantic, Conn., assignors to General Dynamics Corporation, New York, N. Y., a corporation of Delaware Application December 10, 1954, Serial No. 474,478

23 Claims. (Cl. 219—137)

This invention relates to welding and more particularly to the art of butt welding, and this application is a continuation-in-part of our copending applications for patent Serial No. 403,112 filed January 11, 1954 (now abandoned), and Serial No. 425,546, filed April 26, 1954.

The invention is admirably suited for the butt welding together of the ends of lengths of stainless steel pipe although the method of welding according to the invention may be used for welding other stainless steel shapes and also pipes, tubes, cylinders and other shapes of other metals and alloys.

In butt welding stainless steel pipe where a welded pipe must stand up under extremely severe and demanding service conditions, such as under conditions conducive to corrosion, high rates of flow of fluids through the pipe, contact with materials which may be radioactive, and high rates of heat transfer with sudden changes at high temperatures, the process of welding must be one that will produce optimum qualities at the welded joints. Conventional methods of welding will not produce the kind of joints necessary to meet these exacting requirements.

Various methods have heretofore been utilized for butt welding pipes and other shapes wherein lengths of pipe are welded together either with or without the use of welding rings. In some of these methods wherein a back-up ring is not used, the ends of the pipe are chamfered to provide an annular welding groove. Then an electrode is passed around the groove in a so-called "root-pass" to fuse the abutting ends of the pipe and after the root pass there results an annular welding channel closed at its bottom by the fused ends of the pipe, the channel then being filled in with the weld metal from a consumable electrode by so-called "cover" passes, the weld metal being fused to the parent metal at the edges of the pipe wall. The method which does not employ a back-up ring has undesirable drawbacks because in making the root pass in such a way as to obtain proper root penetration and fusion, there is a tendency during the root pass to "burn through" and cause weld drippings to drop into the interior of the pipe or to form unwanted projections or "icicles" on the interior of the welded joint. On the other hand, if the metal is not sufficiently fused, a sufficient penetration into the parent metal for a proper weld is not obtained.

To avoid the undesirable consequences of a "burn through" some methods of welding pipe utilize a back-up ring. According to one method the back-up ring does not become fused to the pipe and must be removed after the joint is welded. According to another method the back-up ring is fused to the joint and is not removed after the joint is welded. One of the primary purposes of utilizing a back-up ring is to avoid the undesirable dripping of weld metal into the interior of the pipe or the formation of protuberances extending into the interior of the pipe. The use of a removable back-up ring is objectionable because it is impractical, if not impossible, in most cases to remove it from the inside of the pipe after the weld is made. And the heretofore known methods that utilize a back-up weld ring that is fused to the joint have been such that the ring, although partially fused at the annular joining edges of the two lengths of pipe being welded together, is not completely fused to the parent metal of the pipe at its internal surfaces. As a result of this, unwanted crevices or microfissures are left, or develop, after the weld is made; or, the metal of the back-up ring which is left at the interior surface of the pipe causes an undue resistance to flow of fluid through the joined lengths of pipe and undesirable pressure drop.

According to this invention a consumable metal weld insert and welding method are provided which overcome the drawbacks inherent in the prior known methods. The welding method comprehends the use of a consumable metal weld insert having a bead-flange portion and a rib portion extending outwardly therefrom, against which are abutted the edges of the parent metal parts which are to be welded together; the bead-flange and rib portions being so designed and proportioned that in the welding process both the rib and bead-flange portions of the insert are completely melted to form successive molten weld puddles along the joint. Both the rib and flange portions of the insert at each successive increment along its length, together with the parent metal adjacent the insert, become fused into a completely molten weld puddle and the flange portion of the insert is transformed from its initial shape or contour by the complete melting and passes through a molten state and is then permitted to resolidify; and, as successive weld puddles along the joint are formed by the welding torch as it is moved in increments along the insert and the successively formed puddles are permitted to cool and the molten metal to resolidify, the metal of the insert becomes an integral part of the welded joint and also forms a substantially flat and substantially smooth bead at the inner surface of the welded joint; the resultant bead having a different contour from the contour which the flange portion of the insert initially had prior to the application of the welding heat.

In the welding together of two lengths of pipe, a specially designed consumable weld ring insert is provided which is inserted or preplaced at the joint between the ends of two lengths of pipe to be welded together. The ends of the two lengths are first chamfered to provide an exposed and accessible welding channel when the two lengths are placed in alignment and in abutting relation with the insert. The insert is so designed and proportioned that, when making the first or root welding pass, the metal of the insert is completely fused (that is, completely melted) and welded to the juncture of the two pipe lengths being joined, forming a homogeneous weld free from cracks and fissures and producing a substantially smooth surface of the weld on the inside surface of the pipe at the joint where the ends of the pipe are welded together. "Consumable insert" as used herein is intended to mean that it is a preplaced filler material which is melted and completely fused into the weld puddle upon the application of controlled heat and the term "completely fused" is intended to mean that the metal is melted to molten condition and is fused into the weld puddle. Also, the metal for the insert may be selected so that upon completion of the weld the welded joint will have predetermined desired metallurgical characteristics.

Although the invention is particularly adapted for butt welding of pipe, it is also applicable to butt welding of metal parts of other shapes and especially where the side of the joint opposite the side to which the welder has access is not readily accessible.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is an exploded view in perspective and partly broken away, illustrating two lengths of pipe to be welded together end to end and the weld ring insert at the juxtaposed ends of the pipe;

Fig. 2 is a view of the parts shown in Fig. 1 but in assembled position and the joint as partially welded during the root pass;

Fig. 3 is a perspective view and partly in section on line 3—3 of Fig. 1 but to larger scale;

Fig. 4 is a perspective view and partly in section on line 4—4 of Fig. 2 and illustrates the position of the weld insert ring and the pipe after the parts are aligned for making the root welding pass;

Figs. 4a to 4d inclusive are views, largely diagrammatic, to illustrate successive stages of the welding process; Fig. 4a illustrating diagrammatically the position and certain dimensional relationships prior to the application of welding heat; Fig. 4b, illustrating diagrammatically the conditions of the puddle after welding heat has been applied to the rib of the insert in a limited area and prior to the time sufficient heat has been applied to completely melt the flange portions of the insert; Fig. 4c illustrating diagrammatically the typical or representative weld puddle just prior to the time sufficient welding heat has been applied to completely melt the flange portion of the insert; and, Fig. 4d illustrating diagrammatically the molten weld puddle after the rib and bead flange portions of the insert have been completely melted, and also illustrating certain dimensional relationships with reference to the initial dimensional relationships as illustrated in Fig. 4a.

Fig. 5 is a view in perspective and partly in section on line 5—5 of Fig. 2 and illustrates the welded joint produced by the root welding pass after the molten metal has cooled and solidified;

Fig. 6 is a plan view illustrating the weldment of the root pass at the place where the arc is applied as illustrated in Fig. 2;

Fig. 7 is a perspective view and partly in section illustrating the welded joint after the root pass has been completed and certain cover passes have been made;

Fig. 8 is a view illustrating the welded joint after the final cover passes have been made and shows the completed welded joint;

Fig. 9 is a view similar to Fig. 8 but showing the inside surface of the completed welded joint;

Figs. 10 and 11 are perspective views and partly in section illustrating modified forms of the weld ring insert and pipe chamfer; and Fig. 12 is a diagrammatic view, showing the cross-section of a weld insert greatly enlarged, to facilitate explanation of the dimensioning of the weld insert according to the invention.

Although the weld insert provided by the invention is applicable to the butt welding of various metals and alloys and to a variety of regular or irregular shapes to be joined by welding, the principles underlying the invention and the manner of carrying it out may perhaps be better understood from the following more detailed description of joining two lengths of heavy stainless steel pipe according to the method of the invention.

Preferably the inert-gas shielded tungsten arc welding method is used in making the root pass. The inert-gas shielded tungsten arc method is per se known and may be briefly described as a welding process in which a welding arc is maintained between a virtually nonconsuming electrode and workpiece while the arc is being shielded by a monatomic inert gas. The inert gas, usually argon or helium, serves to protect the molden pool of weld metal and electrode from the ambient atmosphere, as well as to assist in ionization of the arc. The most commonly used electrode is tungsten or tungsten with thorium added. The arc welding apparatus known in the trade as the "Heliarc" is one suited for practising the welding method of the invention.

In Fig. 1 there is illustrated two lengths 10 and 11 of A. S. T. M. type 347—8" Schedule 40 stainless steel pipe to be welded together at the ends 13 and 14. It will be understood that the two pieces of pipe 10 and 11 may be of any desired lengths and the invention is applicable to the welding of other sizes of pipe, tubes or cylinders and to other shapes to be butt welded together and to metals or alloys other than stainless steel.

An insert ring (designated generally by 15) of suitable composition to produce a weld of predetermined characteristics with the parent pipe 10, 11, is provided. This insert ring, described in further detail hereinafter, is consumable; that is, it is so designed that it is completely fused (viz: completely melted) during the root welding pass. Prior to welding, the pipe ends 13 and 14 to be joined are chamfered; preferably as illustrated in the Figs. 1 and 3. The pipe (lengths 10 and 11 as illustrated in the drawings) has an internal diameter of 8" and a wall thickness of the order of 5/16". The end of each pipe 13, 14, is chamfered so that at the inside (as distinguished from the outside periphery) there is an annular lip 16, 17, each having an annular edge 18, 19, the thickness or width of this edge being of the order of .050". This edge is sometimes referred to in the trade as the "root face" of the butt joint. The radius of the curve of the chamfer at 20, 21 is of the order of 3/16" and the straight side of the chamfer 22, 23 flaring out at an angle of about 30° from vertical.

The insert ring 15 is of particular cross-section and preferably in the shape shown in Figs. 1 and 3; and illustrated in much larger scale in Fig. 12. It will be understood that the insert 15 is a closed ring; the view in Fig. 1 being broken away at 24 better to illustrate this cross-section. It is made of a metal which will produce a weld of predetermined metallurgical characteristics so that the welded joint when completed will have predetermined satisfactory metallurgical properties. With respect to this illustrative embodiment, the pipe being 8" diameter stainless steel type 347, the metal of the insert ring is made of type 347 welding wire. In the welding of stainless steel pipe which is fully austenitic, the weld deposit should contain approximately 4% to 8% ferrite which is not an austenitic deposit. In order to determine the amount of ferrite that will be deposited, the material for the insert ring may be selected with reference to the known Schaeffler diagram which indicates the amount of ferrite that will be deposited for given compositions of electrodes. This principle can be applied to the selection of the insert ring material. Other types of deposits required when welding other than austenitic material may be obtained from other known metallurgical constitution diagrams. In the low alloy heat treatable steels, when joining for instance type 4130 steel, the weld deposit may be chosen to be type 4330 material, to give a weld of strength at least equal to the strength of the parent material both before and after heat treatment.

The insert ring 15 may be conveniently made into the desired cross-sectional shape from standard 5/32" diameter welding rod of desired composition by milling out two oppositely disposed parallel sectors from the rod along its length, leaving the upstanding rib 25; or, it may be formed by other metal working methods. The rod may be cut to desired length and then formed into the ring 15 as shown in Fig. 1. The preferred cross-sectional form of the insert is illustrated perhaps best in Figs. 3 and 12 and it will be observed that it has an annular bead flange portion 26 having an arcuate surface 29 which may be represented as having a radius r when viewed in cross section (see Fig. 12). It has annular circumferential face portions 27, 28 (in the plane 67), one on each side of the centrally located uninterrupted radially and outwardly extending circumferential rib 25, which may be represented as having width w and height h. The diameter of the annular shoulders 27 and 28 of the insert ring 15 is of the same order as the inside diameter of the pipe 10, 11 to be welded. It will now be seen that when the insert ring 15 is placed in position for the root pass welding operation, as shown in Fig. 2 and Fig. 4, the face of the annular shoulder 27 will engage the inner surface 30 of the pipe 10 under the projecting lip 16 and the edge or root face 18 of the lip will abut the side 31 of the rib 25 and the face of the annular shoulder 28 will engage the inner surface 32 of the pipe 11 under the projecting lip 17 and the edge or root face 19 of the lip 17 will abut the side 33 of the rib 25. The bead flange 26 will thus span the junctures where the lips abut the rib 25 so that the bead flange 26 will serve, in effect, as a back-up ring for the root pass welding operation; although as pointed out above, the insert ring is consumable and the rib 25 and the bead flange 26 are so proportioned that both are completely melted and fused with the parent metal during the root welding pass (see Fig. 5 which illustrates the welded joint after the root pass has been made). Also, it will be observed that the rib 25 is of a height of the same order as the height of the root faces 18 and 19 of the projecting annular lips 16 and 17, as illustrated in Fig. 4, in which the parts are shown in the position for welding, and it will be observed that chamfers 22, 23 provide an annular U-shaped welding channel 35 closed at its bottom by the annular rib 25. Also, the rib serves as a gauge for spacing the pipes 10, 11, and it, together with the annular shoulders 27, 28 of the bead flange 26, aid in aligning the pipe preparatory to welding the joint. When so positioned, the U-shaped channel 35 is wide enough for entry, from the outside of the pipe, of the welding electrode 36. It may be noted here that the welding of the root pass is preferably carried out by direct current, straight polarity, with the base metal on the positive side of the line and the electrode 36 on the negative side as illustrated diagrammatically in Fig. 2.

When the ends of the two pipe lengths 10, 11 have been thoroughly cleaned and positioned preparatory to welding by means of the inert-gas shielded arc process, the inside of the pipe is purged with an inert gas such as argon and the juxtaposed pipes are tack welded, preferably at points 37 about 2" apart in the case of 8" diameter pipe. As shown, the ends of the pipe are closed by caps 40, 41, although other closing means to maintain a protective gaseous atmosphere covering the inside surface of the joint being welded, may be employed, and argon or other suitable gas may be introduced from a cylinder 42 through a conduit 43 having a valve 44 into the interior of the pipe and vented at the other end through a conduit 45 having a valve 46. Preferably, the tack welds 37 should not penetrate the bead flange of the insert.

Having made the tack welds, the root welding pass is now made around the pipe at the bottom of the U-shaped welding channel 35. The oxygen-containing atmosphere having been purged from the interior of the pipe with argon gas and the electrode being shielded by argon gas in a known way, the thoriated tungsten electrode 36, sharpened to a fine point, is brought as closely as possible to the starting position on the joint, which is preferably midway between two tack welds. The arc should dwell on the center of the joint long enough to form a molten fluid puddle. When the molten fluid puddle shows an elliptical contour, the bead flange 26 of the insert at the inside of the weld channel will be completely melted. Once this molten puddle is formed, the arc is moved steadily, and preferably with a more or less weaving motion, around the circumference of the weld channel 35 and as it is moved care should be taken to maintain the contour of the surface of the successively formed puddles as nearly flat as possible, as the puddle-forming progresses around the joint with the advance of the electrode and its arc. Fig. 6 illustrates in plan view the molten liquid puddle 50 where the arc strikes the rib 25 and the arc is advanced steadily in the direction of the arrow 51, and 52 represents the surface of the weld after the arc has been advanced beyond it and the molten metal has cooled and solidified. Fig. 5 illustrates the surface 52 of the now solidified but previously molten metal puddles as viewed from the outside of the pipe. Fig. 9 at 53 illustrates the substantially flat bead opposite the surface 52 as viewed from the inside of the pipe; the surface 52 after the root pass is made being shown perhaps best in Fig. 5. By maintaining the contour across the surface of the molten puddles 50 flat as the puddles are progressively produced around the circumference of the pipe, proper melting and fusion of both the rib 25 and the bead flange 26 is assured and proper penetration of the weld into the parent metal of the pipe 10, 11 is obtained, so that as the molten parent and weld metal cools and solidifies the metal forms a relatively flat and smooth bead 53 at the interior surface of the weld joint (see Figs. 5 and 9). For best results, the surface of the molten puddle 50, as each is formed successively along the joint, should be kept as flat as possible. Either convexity or concavity of the surface of the puddle indicates insufficient or excessive heat, respectively. Therefore, the torch 36 and its arc is moved steadily around the circumference of the bottom of the weld channel and maneuvered to maintain a progressively advancing molten puddle so that it will have a surface contour as flat as possible. The electrode is moved progressively around the weld channel until the root pass is completed and slightly overlaps the starting point and then the size of the puddle is tapered off and the arc is broken.

Figs. 4a to 4c illustrate, in diagrammatic fashion, successive stages of the puddle-forming in the welding process. In these figures the like reference characters indicate corresponding parts as designated in the other figures of the drawings. Fig. 4a diagrammatically illustrates the weld insert in position for beginning the welding operation and corresponds generally to Fig. 4. It may be assumed that a Y axis passes through the center of the joint geometry and in the direction of the thickness of the parent metal parts 10 and 11 to be welded together and it may be assumed that an X axis passes perpendicularly to the Y axis in the plane 67 through the surface of the shoulders 27, 28 of the insert. The rib 25 in the gap between the edges 18 and 19 of the parts to be welded together and above the plane 67 may be represented as having a cross sectional area Aa (captioned "Internal Area") and the flange 26 of the insert below the plane 67 may be represented as having a cross sectional area Ab (captioned "External Area"). The flange portion may also be represented as having dimension Dx parallel to the X axis, and having a length equal to the maximum width of the flange portion 26 and a dimension Dy parallel to the Y axis and having a length equal to the maximum height of the flange 26, as illustrated in Fig. 4a.

In observing the puddle forming in our welding process during the root pass, it appears that the forces of surface tension, capillary action and adhesion, act effectively in moving and supporting the molten pool formed by the arc as the torch is moved in increments along the rib of the consumable insert. By visualizing a particular puddle as typical and then visualizing these puddles being formed, cooled and solidified successively as the arc is moved along the rib, it appears that the arc first melts the rib in a limited area and the first molten metal is drawn slightly into the crevices between the insert and base or parent metal of the parts being welded together. On continued application of the heat from the welding torch in this area the rib portion 15 becomes completely molten to form a pool and the heat begins to melt the flange portion and also the parent metal adjacent the rib, as illustrated diagrammatically at 101b in Fig. 4b, it being noted that the molten metal enters into the gaps 102b, 103b. Upon continued applications of heat the metal in the flange portion 26b continues to melt and in the meantime the parent metal adjacent the molten metal puddle becomes melted and fused into the puddle as indicated at 101c in Fig. 4c. At this stage of the puddle-forming 101c of molten metal becomes larger but there still remains a skin of solid metal 104c yet not melted at the peripheral surface of the flange portion of the insert. At this stage of the puddle-forming the solid yet unmolten metal skin 104c serves as an arched bridge of solid metal holding the puddle 101c in place by adhesion and cohesion. The forces of surface tension act against this restraint but as yet have little visual effect. Capillarity and wetting of the joint walls by molten metal cause a concave surface 105c to be formed prior to the melting of the peripheral skin 104c of solid metal. On continued application of the welding heat the peripheral skin 104c melts through and, when this occurs, there is formed a completely molten puddle. Then the surface tension forces in the completely molten puddle act to reduce the peripheral area of the molten pool of metal, now composed of molten weld insert metal and molten parent metal, and the surface tension forces together with wetting and capillarity cause the molten metal to move. Inasmuch as the surface tension forces tend to form the molten puddle into spherodial shape and the other forces are acting simultaneously, the surface of the puddle just before freezing is slightly convex, flat, or concave, but in any case a movement of molten metal of relatively large magnitude has occurred. After the puddle becomes completely molten the molten metal is then drawn, by the forces acting upon it, to the shape illustrated diagrammatically in Fig. 4d. In the meantime the welding torch is moved an increment along the rib of the insert to form a like puddle and the molten puddle 101d as illustrated in Fig. 4d cools and the molten metal solidifies. In view of the fact that the above mentioned forces (although small in themselves) are significantly large in comparison to the gravitational force exerted on the molten metal, the effect of gravitational force on the puddle of molten metal may be considered as almost negligible.

It will be understood, of course, that the foregoing is a description of the action and movement of a typical or representative molten puddle and that in welding a joint, these puddles are being successively formed and the metal resolidified as the welding torch is moved by a more or less weaving motion along the joint in small increments. As the successively formed puddles of molten metal are resolidified on cooling, a substantially flat and substantially smooth bead 53 is formed at the interior surface of the joint.

Referring to Fig. 4d which illustrates diagrammatically the molten weld puddle at the instant of freezing, it will be noted that the bead indicated at 53d below the X axis may be represented as having a cross sectional area Ac (captioned "External Area After Solidification") and as having a width Cx and a height Cy. This area Ac now is composed of a mixture of weld metal from the area Aa, Ab of the insert (see Fig. 4a) and the dilution metal from the parent metal parts 10 and 11. The external area transformation from Ab to Ac is accompanied by an axis ratio, namely Dy/Dx is larger than Cy/Cx.

When the root pass has been made as described it will be noted that the metal of rib and flange of the weld insert has been completely fused (viz: completely melted) together with the metal of the parent metal of the parts being welded adjacent the insert so that there results a root pass weld which is sound throughout with no sharp edges or "icicles" or uneven protuberances on the inside of the joined pipes and the adjoining edges of the completely fused consumable insert and pipe are free from cracks and crevices even of microscopic dimensions.

After the root pass has been made according to the procedure described in the foregoing, and the pipes joined by the root pass weld, as shown in Fig. 5, then the remaining unfilled space in the weld channel 35 is filled by welding in a fusible or consumable electrode, indicated conventionally at 55 in Fig. 7. This may be done in conventional manner by utilizing a consumable weld rod of the same metal as the weld insert 15 or by the other known methods. Sufficient cover passes are made to properly fill the weld channel and to fuse the weld metal to the sides of the channel 35. That is, the consumable weld metal is fused to the exposed ends 22, 23 of the pipes 10, 11. As shown in Fig. 7, three such cover passes have been made; the first indicated at 56; the second indicated at 57; and the third cover pass is indicated at 58 in Fig. 7. The final cover passes 59, 60 and 61 are indicated in Fig. 8.

In proportioning the insert 15, the bead flange 26 below the shoulders 27 and 28 (see Fig. 3) should be such that when the heat of the arc is applied to the exposed surface of the rib 25 in the root welding pass, it will flow toward the periphery of the bead flange and be evenly distributed. Therefore the preferable shape is arcuate, as indicated at 29, so that heat applied through the rib 25 is distributed radially and heat flowing from the rib will be evenly distributed to all points of the periphery of the bead flange 26. However, other shapes may be used which approach the sector 26 with circular contour 29 as shown in Figs. 3 and 4, such, for example, as the shapes illustrated in Figs. 10 and 11 and the height and width of the rib portion of the insert may be varied and need not in all cases be the precise shape and dimensions as shown in the drawings which are intended primarily to be illustrative. Also, the shaping of the ends of the pipes to be welded together may be varied. For example, the ends of the pipes 10a, 11a may be shaped to have a straight chamfer 22a, 23a, and the rib 25a may be shaped with corresponding sides 31a, 33a to receive the pointed lips 18a, 19a at the ends of the chamfered pipes 10a, 11a. Also, the contour of the bead flange may have straight sides forming a polygon approaching an arc, as illustrated in Fig. 11, the bead flange 26b having a polygonal cross-section. The significant point is that the rib and the bead flange portions of the weld insert be so proportioned that the ratio of the amount of metal in the rib portion to the amount of metal in the bead flange portion per unit length be maintained within limits and also so that in making the root pass as described above, both the rib and the bead flange portions of the insert are completely melted and fused into the weld puddle as the welding operation proceeds and penetration of the weld metal into the parent metal is obtained at all points between the weld metal and parent metal.

As stated in the foregoing, the weld insert is preplaced and is consumable. That is, the insert is placed in position in abutting relation with the metal parts to be joined together before the application of the heat of the welding arc and both the rib portion and bead flange portion of the insert are completely melted and fused into the weld puddle as the puddle is progressively advanced along the joint when making the root welding pass. Consequently, complete penetration of the weld metal into the parent metal is brought about. While the insert (when viewed in cross-section) is preferably of particular shape, it may vary within limits as to its dimensions.

Referring to Fig. 12, illustrating a preferred form, the bead flange 26 of the insert 15 has a peripheral surface 29 of arcuate shape which is an arc of a circle and which may be visualized or represented as having a center 65 and a radius $r$, and flat shoulder portions 27, 28, in the same plane 67 from which rib 25 extends outwardly from between the shoulder portions. The rib from side wall 31 to side wall 33 may be represented as having a width $w$, and from its outer surface 66 to the plane 67 of the shoulders 27, 28, as having a height $h$. The rib portion 25 above the plane 67 may be represented as having a cross-sectional area A*a* and the bead flange 26 below the plane 67 may be represented as having a cross-sectional area A*b*. In the preferred form the radius *r* of bead flange 26 has a length of 5/64" (inch), and the rib a width of 1/16" (inch) and a height of 1/16" (inch). In this case A*a* is .0038 square inch and A*b* is .0120 square inch, and the ratio of the amount of metal in the rib portion to the amount of metal in the flange portion per unit length is .317. An insert so dimensioned and so proportioned in cross-sectional area may be used, according to the invention, in butt welding together lengths of pipe, tube, or cylinders in a wide range of diameters, such, for example, as pipe or tube diameters as small as two inches and as large as sixteen inches and even much larger, provided the wall thickness of the pipe, tube, or cylinders is of the same order as the height of the rib, or, if the wall thickness is substantially greater than the height of the rib, the walls are chamfered to provide root faces to abut the rib so that the root faces are of the same order of width as the height of the rib. Preferably the thickness of the root face should not exceed the height of the rib of the insert. It will be understood, also, that in case two metal parts of different shape than a pipe or tube are to be joined together by butt welding according to the invention, like principles as to wall thickness of the metal parts to be joined together in relation to the weld insert will apply as for pipes or tubes.

The cross-sectional areas of the bead flange and rib of the weld insert contemplated by the invention may be varied provided a proper relationship, one to the other, is maintained; that is, the ratio of the cross-sectional area of the rib portion to the cross-sectional area of the flange portion preferably should be within the range of .1 to 1.5.

The preferred relationship with regard to dimensions may be provided by dimensioning the weld insert in accordance with the following formulas:

(1) $$w = \frac{r}{k}$$

(2) $$h = \frac{r}{k'}$$

in which:

*r* is equal to the radius in inches of the bead flange portion; that is, the distance from the peripheral surface of the bead flange to its center;
*w* is the width in inches of the rib;
*h* is the height in inches of the rib;
*k* is a number greater than 1 but less than 1.5; and
*k'* is a number greater than 1 but less than 1.5.

For example, in the illustrative embodiment shown in Fig. 12, *r* is the distance in inches from the arcuate surface 29 to the center 65, which in this particular instance is 5/64" (inch); *w* is the width in inches from side wall 31 to side wall 33 of rib 25, which in this particular instance is 1/16" (inch); *h* is the height in inches from the outer surface 66 of rib 25 to the plane 67 of the shoulders 27, 28; and, in this particular instance is 1/16" (inch), and *k* is 1.25 and *k'* is 1.25. The ratio of the cross-sectional area A*a* to A*b* in this particular instance is .317. However, the ratio of the cross-sectional area of the rib portion to the cross-sectional area of the flange portion may vary within limits. As mentioned above, the ratio of the cross-sectional area of the rib portion to the cross-sectional area of the bead flange portion should be kept within the range .1 to 1.5.

Although in the preferred form of the weld insert, the radius *r* of the bead flange is 5/64" (inch), *r* may in some applications be as small as 3/64" (inch), corresponding, for example, to 3/32" (inch) diameter weld rod. In some applications, *r* may be as great as 1/8" (inch), corresponding to 1/4" (inch) diameter weld rod and in some instances even greater. We have successfully used inserts according to the invention in which the radius *r* was 3/64", 1/16", 5/64", 3/32", 1/8" and 9/64", and in some applications the radius *r* may be greater in certain welding operations. The maximum value of the radius is that beyond which the forces of adhesion, cohesion and surface tension will not permit the desired puddle action. The dimensions of the rib and bead flange portions of the weld insert, according to the invention and which we prefer, may be determined from the formulas set forth above.

However, other dimensions may be employed in proportioning the bead flange portion in relation to the rib portion of the weld insert; that is, the range of the values of *k* and *k'* may be extended beyond those set forth in the formulas above. Satisfactory weld inserts may be made for certain jobs when dimensioned according to the following formulas:

(3) $$w = \frac{r}{k}$$

(4) $$h = \frac{r}{k'}$$

in which:

*r* is the radius in inches of the bead flange portion;
*w* is the width in inches of the rib;
*h* is the height in inches of the rib;
*k* is a number within the range of .6 and 3; and
*k'* is a number within the range of .5 and 3.

The inserts which we have used most extensively in practicing our process have been within the limits of the following formulas:

(5) $$w = \frac{r}{k}$$

(6) $$h = \frac{r}{k'}$$

in which:

*r* is 5/64" (inch);
*w* is the width in inches of the rib;
*h* is the height in inches of the rib;
*k* is a number greater than 1 but less than 2; and
*k'* is a number greater than .75 but less than 1.5.

From the foregoing description it will be seen that our welding method involves the use of a consumable weld insert having a bead-flange portion and a rib portion extending outwardly therefrom against which are abutted the edges of the metal parts to be welded together, the flange and rib portions being so designed and proportioned that in the welding process both the bead flange and rib are completely melted to form successive molten puddles in which both the rib and flange portions of the weld insert together with base or parent metal at each increment along its length becomes molten and fused into a molten weld puddle and the bead flange is transformed from its initial contour by the complete melting and passes through a molten state into resolidified state and has in the meantime become an integral part of the welded joint. In resolidifying, the molten metal of the insert, together with parent metal melted and fused into the weld puddles, forms a substantially flat bead free from protuberances and having a different contour from the contour which the flange portion of the insert initially had prior to the application of welding heat.

Although the invention has been particularly described in connection with the welding together of lengths of stainless steel pipe, it will be apparent from the foregoing description that the method of the invention is applicable not only to the welding together of steel pipes and pipes of other metals but also to the welding of butt weld seams where it is desired to weld other shapes and other metals and alloys. The method of the invention is particularly useful in instances where the front side only of the joint to be welded is accessible to the welder because the insert, which is placed at the inside of the joint between the adjoining parts to be welded together, serves also, in effect, as a consumable and fusible back-up device while the root pass is being made, but by reason of its complete melting and fusion it becomes an integral and fused part of a sound welded joint and therefore does not have the disadvantages inherent in a permanent backing member.

And although the invention has been described in detail in connection with the use of the gas-shielded arc method of welding, it will be apparent from the foregoing description that the method of the invention is not confined to the gas-shielded non-consumable electrode or shielded arc process. Any welding system adapted for applying controlled welding heat in limited and controlled areas and insuring complete melting and fusion of the rib and bead flange portions of the consumable weld insert to produce successive completely molten weld puddles in which both the bead and rib become completely melted and fused, may be employed to practice the invention. It is also significant to note that if the welding electrode is of consumable type, the welding rod consumption per unit length of welded joint when using our method is considerably more uniform than in prior methods because of the weld puddle-forming which characterizes the invention.

The terms and expressions which have been employed herein are used as terms of description and not of limitation, and there is no intention in the use of such terms and expressions of excluding any equivalent of the features shown and described or portions thereof, but it is recognized that various modifications are possible within the scope of the invention claimed.

What is claimed is:

1. In a welding process in which adjacent edges of two metal parts are butt welded together by the use of a welding torch and without the use of a back-up device such as a chill plate or permanent back-up strip, the steps which comprise providing a consumable insert piece against which the edges of the parts to be welded together are abutted and moving the welding torch along one side of said insert and supplying sufficient heat through said torch to completely melt the insert to form successive molten weld puddles as the torch is advanced, the consumable insert being so proportioned as to shape and composition that the heat input from the welding torch completely melts the consumable insert and the parent metal of said parts being welded together where they abut said insert thereby to form successive molten weld puddles containing both metal of the consumable insert and said parent metal combined into the molten puddles, and, as the successive molten puddles are formed, permitting the forces of surface tension, adhesion and cohesion to act upon said successively formed molten weld puddles to form, upon solidification, a homogeneous weld free from cracks and crevices and having a substantially smooth-surface bead on the side of the welded parts opposite the side of the heat input.

2. In a welding process in which adjacent edges of two metal parts are butt welded together by the use of the inert gas shielded arc method without the use of a back-up device such as a chill plate or permanent back-up strip, the steps which comprise providing a consumable insert piece against which the edges of the parts to be welded together are abutted and moving the arc along one side of said insert and supplying sufficient heat through said arc to completely melt the insert and to form successive molten weld puddles as the arc is advanced, the consumable insert being so proportioned as to shape and chemical composition that the heat input from the inert gas shielded arc completely melts the consumable insert and the parent metal of said parts being welded together where they abut said insert thereby to form successive molten weld puddles containing both metal of the consumable insert and said parent metal combined into the molten puddles, and, as the successive molten puddles are formed, permitting the forces of surface tension, adhesion and cohesion to act upon said successively formed molten weld puddles to form, upon solidification, a homogeneous weld of predetermined metallurgical characteristics and free from cracks and crevices and having a substantially smooth-surface bead on the side of the welded parts opposite the side of the heat input.

3. In a welding process in which adjacent edges of two metal parts are butt welded together by the use of a welding torch and without the use of a back-up device such as a chill plate or permanent back-up strip, the steps which comprise providing a consumable insert piece having a bead forming portion and a rib portion extending outwardly from said bead forming portion, against which the edges of the parts to be welded together are abutted and moving the welding torch along said rib portion of said insert and supplying sufficient heat thereto to completely melt the insert and form successive molten weld puddles as the torch is advanced, the consumable insert being so proportioned as to shape and composition that the heat input from the welding torch completely melts the consumable insert and the parent metal of said parts being welded together where they abut said insert thereby forming successive molten weld puddles containing both metal of the consumable insert and said parent metal combined into the molten puddles, and, as the successive molten puddles are formed, permitting the forces of surface tension, adhesion and cohesion to act upon said successively formed molten weld puddles to form, upon solidification, a homogeneous weld free from cracks and crevices and having a substantially smooth-surface bead on the side of the welded parts opposite the side of the heat input.

4. In a welding process in which adjacent edges of two metal parts are butt welded together by the use of the inert shielded arc method and without the use of a back-up device such as a chill plate or permanent back-up strip, the steps which comprise providing a consumable insert piece of predetermined shape and composition against which the edges of the parts to be welded together are abutted and moving the welding arc along one side of said insert and supplying sufficient heat through said arc to completely melt said insert to form successive molten weld puddles as the arc is advanced, the consumable insert being so proportioned as to shape and chemical composition that the heat input from the welding arc completely melts the consumable insert and the parent metal of said parts being welded together where they abut said insert thereby to form successive molten weld puddles containing both metal of the consumable insert and said parent metal combined into the molten puddles, and, as the successive molten puddles are formed, permitting the forces of surface tension, adhesion and cohesion to act upon said successively formed molten weld puddles to form, upon solidification, a homogeneous weld of predetermined metallurgical characteristics and free from cracks and crevices and having a substantially smooth-surface bead on the side of the welded parts opposite the side of the heat input.

5. In a welding process in which adjacent edges of two metal parts are butt welded together which comprises providing a metal weld insert having a flange portion and a rib portion extending outwardly therefrom, the ratio of the cross-sectional area of said rib portion to the cross-sectional area of said flange portion being between .1 and 1.5, arranging the adjacent edges of said two metal parts in abutting engagement with said rib and with said flange portion protruding beyond the inner surfaces of said two metal parts to be welded together, applying controlled welding heat along said rib portion sufficient to completely melt both the rib and flange portions of said insert and permitting the molten metal to cool thereby forming a butt welded joint having a substantially flat and substantially smooth bead at the interior surface of said joint, the cross-sectional area of said bead being less than the initial cross-sectional area of the flange portion of said insert.

6. A method according to claim 5 in which the ratio of the height of the flange portion of the insert to the width of the flange portion of the insert prior to the application of the welding heat is greater than the ratio of the height of the bead to the width of the bead at the interior of the welded joint after the weld insert has been completely melted and resolidified.

7. A method according to claim 6 in which the insert has a metallurgical composition which produces a welded joint having predetermined metallurgical characteristics.

8. The method of butt welding two metal parts together which comprises providing a consumable metal weld insert having a bead flange portion and a rib portion extending outwardly from and lengthwise of said bead flange portion, said rib portion having oppositely disposed side wall surfaces and a top surface, arranging an edge of one of said parts to be welded in abutting engagement with one of said side wall surfaces and an edge of the other of said parts to be welded in abutting engagement with the other of said side wall surfaces in a manner to maintain the top surface of said rib accessible for applying welding heat thereto and with said bead flange portion protruding beyond the inner surfaces of said parts to be welded together, then applying controlled welding heat to the said rib portion in a limited area, supplying welding heat at said limited area until the rib portion and bead flange portion of said insert at said area become completely melted, thereby forming a molten puddle into which metal from said edges of said parts to be welded together and said rib and bead flange portions are fused, then continuously supplying controlled welding heat along said rib in successive increments to form a succession of like molten puddles along said joint and permitting said successively formed molten puddles to successively cool and the molten metal therein to resolidify whereby to form a welded joint free from cracks and fissures and having a substantially smooth bead at its inner surface.

9. The method of butt welding two metal parts together by arc welding which comprises providing a consumable metal weld insert having a bead flange portion and a rib portion extending outwardly from and lengthwise of said bead flange portion, said rib portion having oppositely disposed side wall surfaces and a top surface, arranging an edge of one of said parts to be welded in abutting engagement with one of said side wall surfaces and an edge of the other of said parts to be welded in abutting engagement with the other of said side wall surfaces in a manner to maintain the top surface of said rib accessible to the arc welding torch and with said bead flange portion protruding beyond the inner surfaces of said parts to be welded together, then establishing a welding arc between the electrode torch and said insert and applying heat thereby to the top surface of said rib portion in a limited area, causing said torch to dwell at said limited area until the rib portion and bead flange portion of said insert at said area become completely melted, thereby forming a molten puddle into which metal from said edges of said parts to be welded together and said rib and bead flange portions are fused, then moving said welding arc in successive increments along said rib to form a succession of like molten puddles along said joint and permitting said successively formed molten puddles to successively cool and the molten metal therein to resolidify whereby to form a welded joint free from cracks and fissures and having a substantially smooth bead at its inner surface.

10. A method of joining two metal parts by butt welding the edges of the parts which comprises providing a chamfered portion having a lip portion at each edge of the two metal parts where they are to be joined together, providing a fusible metal insert of weld metal having a bead flange having a face portion and a rib portion extending outwardly from the face of said flange portion, positioning the edges of the lip portions of said parts in such position with respect to said insert that the edge of the lip portion of one of said parts abuts said rib portion on one side thereof and the edge of the lip portion of the other of said parts abuts said rib on the other side thereof and the said bead flange spans the junctures between said lip portions and rib, so that said chamfered portions and rib provide a welding channel closed at its bottom end by said rib portion, directing an arc in said welding channel against the rib portion of said insert of sufficient intensity to develop sufficient heat to completely melt and fuse both the rib portion and flange portion of said insert at the place where said arc is applied and moving the arc progressively along said rib and thereby completely fusing both the rib and flange portions of said insert to the two metal parts and forming, upon cooling, a homogeneous welded joint free from cracks and crevices and having a substantially smooth surface at the side of the joint opposite to the side from which the arc is applied.

11. A method of welding together two lengths of pipe end to end which comprises chamfering the ends of the pipe lengths so as to provide an annular outwardly extending lip at the interior surface of each pipe length; providing a weld metal ring insert having an annular bead flange which has an annular face whose diameter corresponds to the internal diameter of the said pipe and an annular rib extending outwardly and radially from said annular face providing an annular shoulder at each side of said rib; placing the chamfered end of one of said lengths of pipe in abutting relation with said ring insert so that the annular end of its said lip abuts one side of said rib with the interior surface of that pipe length engaging the adjacent annular shoulder of said bead flange and placing the chamfered end of the other of said lengths of pipe so the annular end of its said lip abuts the other side of said rib with the interior surface of that pipe length engaging the other annular shoulder of said bead flange; said chamfered ends and rib thus forming an annular welding channel; and then completely melting and fusing both said annular rib and bead flange by a root welding pass progressively around the foot of said welding channel thereby to form a continuous homogeneous weld having a smooth substantially flat surface on the interior surface of the pipe at the welded joint which is free from cracks, crevices and sharp protuberances.

12. A method of welding together two lengths of pipe end to end which comprises providing the ends of the pipe lengths with a curved chamfer so as to provide an annular lip having an exposed edge of predetermined height at the interior side of each pipe length, providing a weld metal ring insert having an annular bead flange which has an annular face whose diameter corresponds to the internal diameter of the said pipe and a centrally located annular rib extending outwardly and radially from said annular face a distance substantially equal to the height of the annular ends of said annular lips, said face providing an annular shoulder at each side of said rib, placing the chamfered end of one of said lengths of pipe in abutting relation with said ring insert so that the annular end of its said lip abuts one side of said rib with the interior surface of that pipe length engaging the adjacent annular shoulder of said bead flange and placing the chamfered end of the other of said lengths of pipe so that the annular end of its said lip abuts the other side of said rib with the interior surface of that pipe length engaging the other annular shoulder of said bead flange, the exterior annular surface of said rib lies substantially flush with the outer annular surface of said lips, said chamfered ends and rib forming an annular U-shaped welding channel, and then completely melting and fusing both said annular rib and bead flange by a root welding pass progressively around the foot of said welding channel thereby to form a continuous homogeneous weld having a smooth substantially flat surface on the interior surface of the pipe at the welded joint which is free from cracks and crevices and sharp protuberances.

13. A method of welding together two lengths of pipe end to end which comprises providing the ends of the pipe lengths with a curved chamfer so as to provide an annular lip having an exposed edge of predetermined height at the interior side of each pipe length, providing a weld metal ring insert having an annular bead flange which has an annular face whose diameter corresponds to the internal diameter of the said pipe and a centrally located annular rib extending outwardly and radially from said annular face a distance substantially equal to the height of the annular ends of said annular lips, said face providing an annular shoulder at each side of said rib, placing the chamfered end of one of said lengths of pipe in abutting relation with said ring insert so that the annular end of its said lip abuts one side of said rib with the interior surface of that pipe length engaging the adjacent annular shoulder of said bead flange and placing the chambered end of the other of said lengths of pipe so that the annular end of its said lip abuts the other side of said rib with the interior surface of that pipe length engaging the other annular shoulder of said bead flange, the exterior annular surface of said rib lies substantially flush with the outer annular surface of said lips, said chamfered ends and rib forming an annular U-shaped welding channel, and then completely melting and fusing both said annular rib and bead flange by a root welding pass progressively around the foot of said welding channel thereby to form a continuous homogeneous weld having a smooth substantially flat surface on the interior surface of the pipe at the welded joint which is free from cracks and crevices and sharp protuberances, and after said root welding pass has been completed filling the welding channel by using a fusible weld metal and making sufficient cover welding passes with said fusible weld metal to fill said channel.

14. The method of welding two lengths of pipe together end to end, the ends of said lengths first having been chamfered to provide an annular lip at the inner side of the wall of the pipe; which method comprises providing a weld metal ring insert having an annular bead flange portion which has an arcuate contour at its interior surface and a flat contour at its exterior surface when viewed in cross-section, and having a centrally located annular rib extending outwardly and radially from said exterior surface, thus providing an annular shoulder on each side of said rib, the diameter of said annular shoulders being of the same order as the internal diameter of said pipe, arranging the ends of said pipe lengths to be welded in abutting relation with said insert so that the annular end of one of said lips engages one side of said rib and the interior surface of that length of pipe engages one of said annular shoulders and the annular end of the other of said lips engages the other side of said rib and the interior surface of said other length of pipe engages the other of said annular shoulders, and when so arranged the said chamfered ends form an annular welding channel accessible from the exterior of said pipe for entry of an arc welding electrode, said channel being closed at its bottom by said rib, then passing an electric arc from a non-consumable electrode steadily and progressively around the bottom of said annular welding channel to completely melt and fuse both said rib and bead flange and then cooling the molten metal thereby forming a root pass weld that completely penetrates the parent metal of the pipe and produces a welded joint free from cracks and crevices and that has a substantially flat smooth surface on the interior side of said pipe.

15. The method of welding two lengths of pipe together end to end, the ends of said lengths first having been chamfered to provide an annular lip at the inner side of the wall of the pipe; which method comprises providing a weld metal ring insert having an annular bead flange portion which has an arcuate contour at its interior surface and a flat contour at its exterior surface, and having a centrally located annular rib extending outwardly and radially from said exterior surface, thus providing an annular shoulder on each side of said rib, the diameter of said annular shoulders being of the same order as the internal diameter of said pipe, arranging the ends of said pipe lengths to be welded in abutting relation with said insert so that the annular edge of one of said lips engages one side of said rib and the interior surface of that length of pipe engages one of said annular shoulders and the annular edge of the other of said lips engages the other side of said rib and the interior surface of said other length of pipe engages the other of said annular shoulders, and when so arranged the said chamfered ends form an annular welding channel accessible from the exterior of said pipe for entry of an arc welding electrode, said channel being closed at its bottom by said rib, then while maintaining the interior of the juxtaposed pipe lengths purged with an inert gas, passing an inert-gas shielded arc from a non-consumable electrode steadily and progressively around the bottom of said annular welding channel and completely fusing both said rib and bead flange thereby forming a root pass weld that completely penetrates the parent metal of the pipe and produces a welded joint free from cracks and crevices and that has a substantially flat smooth surface on the interior side of said pipe.

16. A consumable, preplaceable weld insert rod for butt welding two metal parts together and made of weld metal which (when viewed in cross section) comprises a bead flange portion of generally arcuate shape having a pair of oppositely disposed shoulders and a rib portion extending outwardly from said bead flange portion from between said shoulders, said bead flange and rib portions being dimensioned according to the following formulas:

(1) $$w=\frac{r}{k}$$

(2) $$h=\frac{r}{k'}$$

in which:

$r$ is the radius in inches of the bead flange portion but not exceeding $\%_{64}$ inch;
$w$ is the width in inches of the rib portion;
$h$ is the height in inches of said rib portion;
$k$ is a number within the range of .6 to 3; and
$k'$ is a number within the range of .5 to 3.

17. A consumable, preplaceable weld insert rod for butt welding two metal parts together and made of weld metal which (when viewed in cross section) comprises an arcuately shaped bead flange portion having a pair of oppositely disposed shoulders and a rib portion extending outwardly from said bead flange portion from between said shoulders, said bead flange and rib portions being dimensioned according to the following formulas:

(1) $$w=\frac{r}{k}$$

(2) $$h=\frac{r}{k'}$$

in which:

$r$ is the radius in inches of said bead flange portion and is a length within the range of $3/_{64}''$ (inch) to $9/_{64}''$ (inch);
$w$ is the width in inches of said rib portion;
$h$ is the height in inches of said rib portion;
$k$ is a number within the range of 1 to 2; and
$k'$ is a number within the range of .75 to 1.5.

18. A consumable, preplaceable weld insert rod for butt welding two metal parts together and made of weld metal which, when viewed in cross-section, comprises an arcuately shaped bead flange portion having a pair of oppositely disposed shoulders, and a rib portion extending outwardly from said bead flange portion from between said shoulders, said bead flange and rib portions being dimensioned according to the following formulas:

(1) $$w = \frac{r}{k}$$

(2) $$h = \frac{r}{k'}$$

in which $r$ is the radius in inches of said bead flange portion and is from $3/64''$ (inch) to $1/8''$ (inch) in length;
$w$ is the width in inches of said rib portion;
$h$ is the height in inches of said rib portion;
$k$ is a number greater than 1 and less than 1.5; and
$k'$ is a number greater than 1 and less than 1.5.

19. A consumable preplaceable weld insert rod for butt welding two metal parts together and made of weld metal which (when viewed in cross-section) comprises an arcuately shaped bead flange portion having a pair of oppositely disposed shoulders, and a rib portion extending outwardly from said bead flange portion from between said shoulders, said bead flange and rib portions being dimensioned according to the following formulas:

(1) $$w = \frac{r}{k}$$

(2) $$h = \frac{r}{k'}$$

in which $r$ is the radius in inches of said bead flange portion and is $5/64''$ (inch) in length;
$w$ is the width in inches of said rib portion;
$h$ is the height in inches of said rib portion;
$k$ is a number greater than 1 and less than 1.5; and
$k'$ is a number greater than 1 and less than 1.5.

20. A consumable preplaceable weld insert for butt welding two metal parts together and made of weld metal which (when viewed in cross-section) comprises an arcuately shaped bead flange portion having a pair of oppositely disposed shoulders, and a rib portion extending outwardly from said bead flange portion and from between said shoulders, said bead flange portion having a radius the length of which is of the order of $5/64''$ (inch), said rib having a width of the order of $1/16''$ (inch), and a height of the order of $1/16''$ (inch).

21. A weld insert constructed according to claim 16 in which the ratio of the cross-sectional area of the rib portion to the cross-sectional area of the bead flange portion is within the range of .1 to 1.5.

22. A weld insert constructed according to claim 16 which is made of stainless steel weld metal.

23. A weld insert constructed according to claim 16 which is in the form of a ring.

References Cited in the file of this patent

UNITED STATES PATENTS

| | | |
|---|---|---|
| Re. 22,725 | Von Ahrens | Feb. 19, 1946 |
| 1,453,343 | Fay | May 1, 1923 |
| 1,532,842 | Stresau | Apr. 7, 1925 |
| 1,643,227 | Stresau | Sept. 20, 1927 |
| 1,981,850 | Fisher | Nov. 27, 1934 |
| 2,405,542 | Wassell | Aug. 6, 1946 |
| 2,496,188 | Wiese | Jan. 31, 1950 |